United States Patent [19]

Sargisson et al.

[11] 4,446,696

[45] May 8, 1984

[54] COMPOUND PROPULSOR

[75] Inventors: Donald F. Sargisson, Cincinnati; Daniel L. Harshman, Forest Park, both of Ohio

[73] Assignee: General Electric Company, Cincinnati, Ohio

[21] Appl. No.: 278,924

[22] Filed: Jun. 29, 1981

[51] Int. Cl.³ .................. F02K 3/06; F02K 3/072; F02K 3/075
[52] U.S. Cl. ................................................ 60/226.3
[58] Field of Search ............ 60/262, 263, 226 R, 60/226 B; 416/125, 129, 130, 153

[56] References Cited

U.S. PATENT DOCUMENTS

| 1,793,933 | 2/1931 | Hoffman | 416/125 |
|---|---|---|---|
| 2,533,346 | 12/1950 | Brady et al. | 416/153 |
| 2,619,795 | 12/1952 | Drake | 60/226 R |
| 3,025,025 | 3/1962 | Duttmann | 244/62 |
| 3,368,352 | 2/1968 | Hewson | 60/226 R |
| 3,678,690 | 7/1972 | Shohet et al. | 60/226 |
| 4,080,785 | 3/1978 | Koff et al. | 60/226 B |
| 4,132,068 | 1/1979 | Johnston | 60/226 A |
| 4,222,235 | 9/1980 | Adamson et al. | 60/226 R |
| 4,254,619 | 3/1981 | Giffin et al. | 60/226 R |

FOREIGN PATENT DOCUMENTS

| 2206728 | 9/1972 | Fed. Rep. of Germany | 60/226 R |
|---|---|---|---|
| 508343 | 1/1955 | Italy | 416/125 |
| 259296 | 1/1949 | Switzerland | 416/125 |
| 267849 | 4/1950 | Switzerland | 416/125 |

*Primary Examiner*—Carlton R. Croyle
*Assistant Examiner*—Jeffrey A. Simenauer
*Attorney, Agent, or Firm*—Douglas S. Foote; Derek P. Lawrence

[57] ABSTRACT

A compound propulsor for powering a vehicle, such as an aircraft. A compound propulsor includes a core gas turbine engine, a fan encased within a cowl, at least one propeller, and drive means for distributing a portion of the power produced by the core engine to the fan and another portion to the propeller. Preferably, the compound propulsor also includes variable geometry inlet guide vanes for varying the portions of power distributed to the fan and propeller.

20 Claims, 7 Drawing Figures

COMPOUND PROPULSOR

BACKGROUND OF THE INVENTION

1. Field of the Invention

This invention relates to gas turbine engines and particularly to a new and unique compound propulsor which efficiently incorporates within it a core gas turbine engine powering a fan and at least one propeller.

2. Description of the Prior Art

Several types of gas turbine engines are currently used to power aircraft. Two types of such engines are the turbofan and the turboprop. The turbofan engine employs a core gas turbine engine to power a fan, while the turboprop engine employs a core gas turbine engine to power a propeller.

A highly efficient type of turbofan engine is the high bypass ratio turbofan which employs a large diameter fan. The maximum performance benefits obtainable from a high bypass ratio turbofan occur during a different phase of flight than do the performance benefits from a turboprop. The performance and efficiency of a turboprop engine are superior at lower flight speeds, such as cruise in the Mach 0.5 to 0.65 range. At speeds above $M=0.7$, the performance of the turboprop deteriorates due to reduced propeller efficiency and high installation losses, that is, drag losses caused by the increased velocity of the air in the propwash flowing over or against aircraft surfaces. At such flight speeds, the relative helical velocity of the propeller tip becomes supersonic and the compressibility effects then reduce propeller efficiency and create undesirable undesirable aerodynamic noise. At high subsonic speeds, such as $M=0.7$ to 0.8 as would be encountered during the cruise phase of a typical modern commercial airplane flight, the performance and installed propulsive efficiency of a turbofan engine can exceed that of a turboprop which uses conventional propeller blades.

The thrust lapse rate, that is, the decrease in engine thrust with increasing altitude and airspeed, is a means of comparing engine performance.

The thrust lapse rate of a turboprop engine is greater than the thrust lapse rate of a high bypass turbofan engine. Because of such a high lapse rate, the propeller of a turboprop would be greatly oversized at low altitude/low speed conditions (e.g. takeoff) in order to provide the amount of thrust at high altitude/high speed conditions which would be avilable from a high bypass turbofan engine of equivalent core size. The extra weight and other disadvantages of an oversized propeller make the use of a turboprop at high altitude and high speed undesirable.

Likeise, at low air speeds, the fuel efficiency of an installed turboprop exceeds that of a turbofan. At high subsonic speeds, on the other hand, a high bypass ratio turbofan can be more fuel efficient than a turboprop, due to the above-mentioned propeller inefficiencies and reduced installation losses.

Many current aircraft designed for relatively short flight distances, such as between 200 and 1,000 nautical miles, selectively employ either turbofan or turboprop engines. When takeoff and landing performance is particularly important, due to short runway lengths or obstructions near an airport, for example, and noise suppression requirements can be met, turboprop engines are selected. When improved block time performance and fuel efficiency at high speed cruise is important, for example minimize flight time and fuel costs for passengers or cargo, high bypass ratio turbofan engines are selected. Yet the selection of one type of engine correspondingly results in some loss of the total performance benefits which would have been obtained from the type engine not selected.

A problem encountered with turboprop engines is propeller-generated noise. A turboprop engine tends to be noisier than a turbofan engine with an equivalent core size. The fan cowl which encases the fan and the fan duct in a turbofan engine can be acoustically treated to muffle noise, whereas the propeller of a turboprop engine extends into the airstream where noise muffling is difficult. Additionally, the level of noise generation of a turboprop increases with an increase in the rotational speed of the propeller and with an increase in propeller blade pitch. Such noise can be disturbing not only to the community over which the aircraft flies but also within the interior of the aircraft itself.

In view of the above-mentioned problems, it is therefore an object of the present invention to provide a compound propulsor which includes the efficiency and performance benefits of a turboprop engine yet which can develop adequate thrust at high altitude and airspeeds without the need for an oversized propeller.

Another object of the present invention is to provide a compound propulsor in which fuel efficiency is optimized throughout all phases of flight.

Yet another object of the present invention is to provide a compound propulsor which includes the performance benefits of a turboprop engine but in which the propeller generated noise can be selectively reduced.

SUMMARY OF THE INVENTION

The present invention comprises a compound propulsor, such as for use on an aircraft, which combines the engine performance and fuel efficiency benefits of both a turbofan and a turboprop engine. The compound propulsor comprises a core gas turbine engine, a fan section including a fan encased within a cowl, at least one variable pitch propeller, and drive means for coupling the core engine with the fan and the propeller. The drive means is arranged for distributing a portion of the power produced by the core engine to the fan and another portion of the power to the propeller.

In a particular embodiment of the invention, the compound propulsor includes variable geometry inlet guide vanes with suitable controls and actuator means disposed upstream of the fan which are operable to vary the load on the fan and thus vary the power distribution between the propeller and the fan.

In another embodiment of the invention, the compound propulsor includes two propellers, which can be arranged to be counterrotating.

In yet another embodiment of the invention, the compound propulsor includes a first full sized propeller and a second, radially shorter cropped propeller, which can operate with a differential blade pitch setting relative to the first propeller.

BRIEF DESCRIPTION OF THE DRAWINGS

This invention will be better understood from the following description taken in conjunction with the accompanying drawing, wherein.

DESCRIPTION OF THE PREFERRED EMBODIMENT

Figure 1:
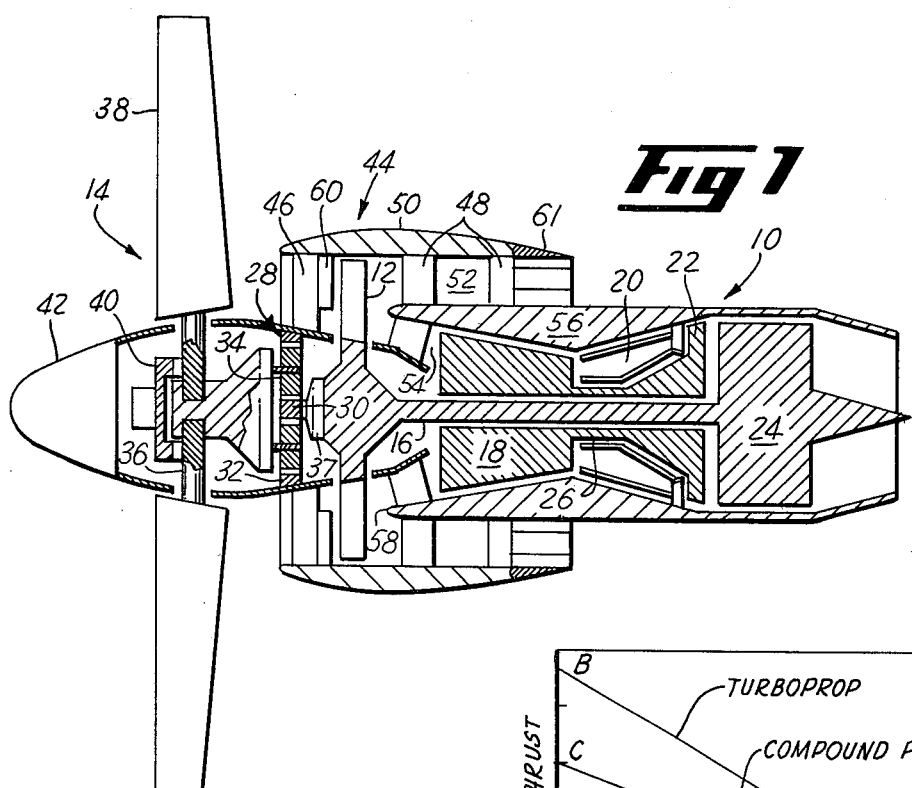
FIG. 1 is a cross-sectional view of one embodiment of a compound propulsor incorporating features of the present invention.

Turning now to a consideration of the drawing, and in particular to FIG. 1, there is shown one embodiment of the compound propulsor of the present invention. The compound propulsor comprises a core gas turbine engine 10 powering a fan 12 and a propeller 14. Drive means, such as the rotatable shaft 16, couples the core engine 10 with the fan 12 and the propeller 14 to distribute a portion of the power produced by the core engine 10 to the fan 12 and another portion of the power to the propeller 14.

The core engine 10 is a typical gas turbine engine having a compressor 18, a combustor 20, a high pressure turbine 22, and a low pressure turbine 24. Air is compressed by the compressor 18 and flows into the combustor 20, wherein it is mixed with fuel and burned. The resulting expanding hot gases exit the combustor and flow across the high pressure turbine 22 and then across the low pressure turbine 24, causing the rotor blades of both turbines to rotate. A shaft 26 connects the high pressure turbine 22 to the compressor 18, permitting the compressor rotor to be rotated, and thus the compressor to be powered, by the high pressure turbine.

Similarly, the rotatable shaft 16 connects the low pressure turbine 24 to the fan 12 and the propeller 14. The rotatable shaft 16 preferably drives the fan 12 directly, that is, at a one-to-one ratio. Preferably, the rotatable shaft 16 drives the propeller 14 through a gear train 28 that reduces the propeller rotational speed. The gear train 28 can comprise any suitable arrangement and size of gears to drive the propeller 14 at a rotational speed that can be chosen to provide the optimum propeller and fan performance matching. One example of such a gear train 28 is shown in FIG. 1 as a sun gear 30 attached directly to the rotatable shaft 16, a fixed ring gear 32 spaced radially outwardly of and apart from the sun gear 30, and a plurality of planetary gears 34 disposed between the sun gear and the ring gear and attached with the hub 36 of the propeller 14. Of course other gear train configurations can be employed as well.

In the event that the core engine 10 should shut down in flight, it is desirable that the propeller 14 not be permitted to rotate the fan 12 or the low pressure turbine 24, a situation which would create negative torque. Therefore, the compound propulsor preferably includes means for disengaging the gear train 28 from the rotatable shaft 16 in the event of negative torque. Such disengagement means could, for example, comprise an overrunning clutch 37 connecting the gear train 28 with the rotatable shaft 16.

The gear train 28 can be advantageously arranged to reduce the noise level generated by the propeller 14. A reduction in propeller tip speed will result in a reduction of noise generation at a given blade pitch angle. Thus, the gear train 28 can be selected to drive the propeller 14 at a rotational speed which delivers the desired combination of thrust and level of noise generation.

The propeller 14 includes a plurality of propeller blades 38 extending generally radially outwardly from the hub 36. The number and shapes of the blades 38 can be as desired and the blades 38 shown in FIG. 1 represent one example only. Furthermore, it is intended that the term "propeller" also include within its meaning the propeller configuration sometimes referred to as a "prop fan", that is, a propeller having a large number of highly swept blades. The propeller 14 includes means for varying the pitch of the blades 38. Such pitch varying means, represented by the box 40, can be, for example, a self-contained hydraulically actuated pitch change mechanism. Of course, alternatively, other suitable means for varying the pitch of the blades 38 could be employed as well, such as electric motors with geared drives.

The propeller 14 also preferably includes a belletnose shaped spinner 42 at the upstream end thereof for protecting the hub 36 and reducing drag at high cruise speeds.

The compound propulsor also includes a fan section 44. The fan section 44 comprises the fan 12, a plurality of inlet guide vanes 46 disposed upstream of the fan 12, and a plurality of outlet guide vanes 48 disposed downstream of the fan 12. A generally annular cowl 50 encases the fan 12 and the inlet and outlet guide vanes 46 and 48. The cowl 50 is also supported by the inlet and outlet guide vanes 46 and 48. The fan 12 comprises a plurality of generally radially extending fan blades.

As can be seen in FIG. 1, the core engine 10 and the fan section 44 are configured whereby the gas flowpath downstream of the fan 12 comprises a bypass flow duct 52 and a core flow duct 54. The two flow ducts 52 and 54 are separated by the annular core casing 56, at the upstream end of which is a generally annular splitter 58. The bypass flow duct 52 is defined between the cowl 50 and the core casing 56 and directs the flow of air through it to bypass the core engine 10. The core flow duct 54 is defined between the core casing 56 and the radially inner boundaries of the compressor 18, the combustor 20, and the high and low pressure turbines 22 and 24, and thereby directs a flow of air and gases through the core engine 10.

The inlet guide vanes 46, which are disposed upstream of the fan 12, preferably comprise variable geometry inlet guide vanes. The variable geometry inlet guide vanes are effective for modulating the amount of airflow to the fan. An example of one such vane are the part span variable guide vanes 60 disclosed in U.S. Pat. No. 4,254,619—Giffin, III et al, 1981, assigned to the same assignee as is the present invention, the disclosure of which is incorporated herein by reference. Such part span variable guide vanes 60 extend from the downstream edge of the inlet guide vanes 46 and are pivotally positionable to modulate the flow of air to the fan 12. The part span variable guide vanes 60 are disposed whereby they are generally axially aligned with the bypass flow duct 52 so as to modulate the flow of air primarily of the bypass flow duct 52. Thus, the total pressure and the total flow of air to the core flow duct 54 is substantially unaffected by the part span variable guide vanes 60.

When variable geometry inlet guide vanes, such as the part span variable guide vanes 60, are incorporated in the compound propulsor, it is preferable that there also be included means for correspondingly varying the area of the exit nozzle of the bypass flow duct 52 in order to maintain proper flow characteristics therethrough. One example of such means is a plurality of flaps 61 pivotally connected around the downstream end of the cowl 50. Flaps suitable for use with the compound propulsor are disclosed in U.S. Pat. No. 4,132,068—Johnston, 1979, the disclosure of which is incorporated herein by reference. Pivoting of the flaps 61 away from or toward the core casing 56 increases or decreases the nozzle area.

The compound propulsor shown in FIG. 1 is particularly suitable for use on aircraft designed for relatively short length flights, that is, in the 200-1,000 nautical mile range, and at maximum cruise speeds of approximately M=0.7 to 0.8. Under such operating conditions, it is preferable that the bypass ratio of the compound propulsor fan section be between 2 and 6. The bypass ratio is the ratio of the mass flow of air flowing through the bypass flow duct 52 to the mass flow of air flowing through the core flow duct 54.

The incorporation in the compound propulsor of a variable geometry inlet guide vane feature, for example the part span variable guide vanes 60, comprises a means for varying the portions of the power distributed between the fan 12 and the propeller 14 to therefore allow maximum benefit from the fan and propeller efficiency characteristics during all phases of the flight. For example, during low speed operation, such as during climb or low speed cruise, it is desirable that most of the power produced by the core engine 10 be distributed to the propeller 14 which produces a great amount of thrust at low speed. Likewise, the propeller 14 is more fuel efficient at low speeds than is the fan 12. To achieve a power distribution whereby the propeller 14 receives most of the power from the core engine 10, the part span variable guide vanes 60 are positioned whereby they minimize the amount of air flowing to the fan 12, thereby reducing the load on the fan. Thus, for a given amount of power produced by the core engine 10, less of the power need be distributed to the fan 12 and more of the power is available to the propeller 14. The extra power is absorbed by the propeller by an increase in the pitch of the propeller blades 38.

Conversely, during higher speed phases of the flight, such as the cruise phase, the performance and fuel efficiency of the fan 12 of the compound propulsor can exceed that of the propeller 14. Therefore, it is desirable that a higher proportion of the power produced by the core engine 10 be distributed to the fan 12 rather than to the propeller 14. To accomplish such a power distribution, the part span variable guide vanes 60 are positioned whereby they maximize the amount of air flowing to the fan 12, thereby increasing the load on the fan. For a given amount of power produced by the core engine 10, more power is required to be distributed to the fan 12 due to the increased load on the fan, and thus less power is available to the propeller 14. The pitch of the blades 38 of the propeller is decreased to reduce loading on the propeller and to thereby accept the reduced portion of power distributed to it.

Of course, many combinations of power distribution to the fan 12 and to the propeller 14 are possible between the distributions mentioned above.

Figure 2:
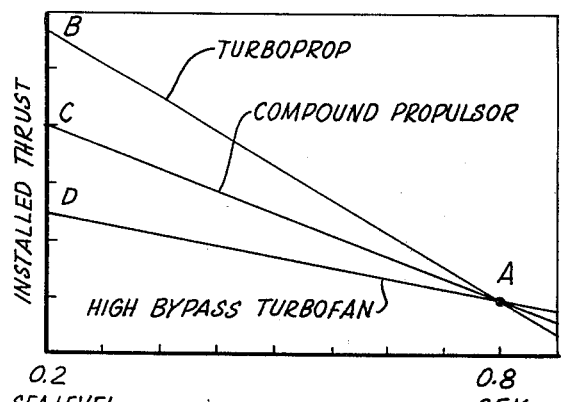
FIG. 2 is a graph of the thrust lapse rates of a turboprop, a compound propulsor and a turbofan.

Some advantages of the compound propulsor can be explained from the graph shown in FIG. 2. The graph shows the thrust lapse rates of a turboprop, a high bypass turbofan and a compound propulsor, each with an equivalent size core engine. As can be seen, the thrust lapse rate, or slope of the line, for the compound propulsor is less than the thrust lapse rate, or slope of the line, for the turboprop. Point A indicates the desired thrust from each engine at a relatively high altitude and high airspeed. Points B, C and D indicate the amounts of thrust available at a low altitude and low airspeed from the turboprop, the compound propulsor and the turbofan, respectively, due to their lapse rates. As can be seen, at low airspeed and low altitude, the compound propulsor (Point C) delivers more thrust than does the high bypass turbofan (Point D) but less than does the turboprop (Point B). In order for the turboprop to deliver the thrust indicated at Point B, the diameter of its propeller must be considerably larger than the diameter of the propeller on the compound propulsor. Thus, the compound propulsor delivers the same amount of thrust at a high altitude and high airspeed (Point A) as does the high bypass turbofan yet delivers more thrust than does the turbofan at low altitude and low airspeed (Point C) employing a propeller of reduced size relative to that required by the turboprop. The reduced size propeller results in corresponding weight, cost and reduced installation loss advantages. A smaller diameter propeller provides several additional advantages. When the aircraft's landing gear length is determined by the propeller size, a smaller propeller allows use of shorter landing gear which further reduces cost and weight. A smaller propeller which delivers lower horsepower and torque allows a smaller, lighter geartrain to be employed. Furthermore, a reduced diameter propeller permits the propeller and gear train to rotate at a higher RPM while maintaining the propeller tip speed within desired limits. A gear train operated at a higher RPM results in reduced torque in the gear stages and a lower toal gear train ratio which can reduce complexity and cost.

The part span variable guide vanes 60 can also be advantageously employed to reduce the noise levels generated by the compound propulsor. For example, when the aircraft on which the engine is mounted is flying at a relatively low altitude over a community and noise reduction is desired, the variable guide vanes 60 can be positioned to increase the load on the fan 12 and thereby reduce the load on the propeller 14. In response, the pitch of the blades 38 of the propeller 14 is decreased and thereby the noise level generated by the propeller is decreased. The cowl 50 encasing the fan 12 can include an acoustic treatment such that the noise level generated by the fan 12 is not correspondingly increased.

An additional advantage of the compound propulsor is that a separate thrust reverser system need not be incorporated therein, as would be required in a conventional turbofan engine. The variable pitch feature of the propeller 14 provides a thrust reversing capability. Correspondingly, the elimination of a separate thrust reverser system helps to offset the weight of the propeller 14.

Figure 3:
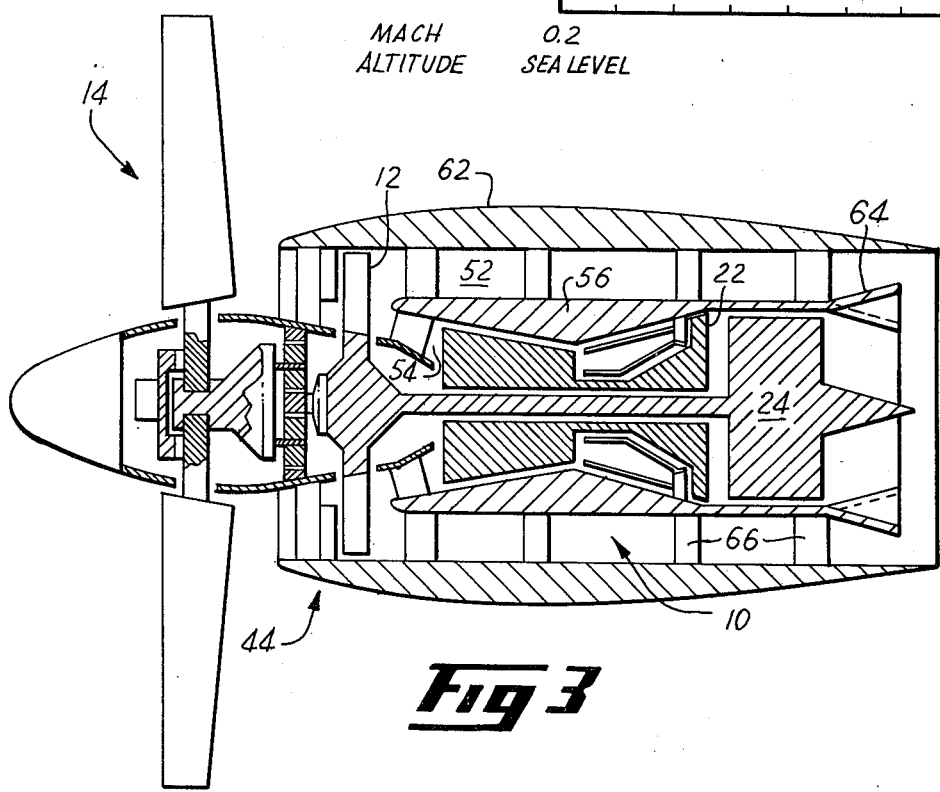
FIG. 3 is a cross-sectional view of a second embodiment of a compound propulsor incorporating features of the present invention.

Turning now to FIG. 3, there is shown a second configuration of the compound propulsor. Elements in this second and subsequent configurations which are identical with elements of the first configuration will be identified with the same numerals.

The compound propulsor shown in FIG. 3 includes a core engine 10, a fan 12 and a propeller 14 which are coupled and operate in the same manner as that described above for the first configuration. The second configuration includes a cowling 62 which extends from the fan section 44 to past the downstream end of the core engine 10. The cowling 62 defines the radially outer boundary of the bypass flow duct 52, the bypass flow duct 52 being disposed radially outwardly of the core engine 10.

As can be seen in FIG. 3, the compound propulsor of this configuration also includes mixer means, such as the multilobe mixer 64, disposed downstream of the high and low pressure turbines 22 and 24. The mixer 64 mixes at least a portion of the gases flowing through the bypass flow duct 52 with at least a portion of the gases flowing through the core flow duct 54 in order to gain an increase in thrust, particularly at high engine power settings for climb and cruise.

Figure 4:
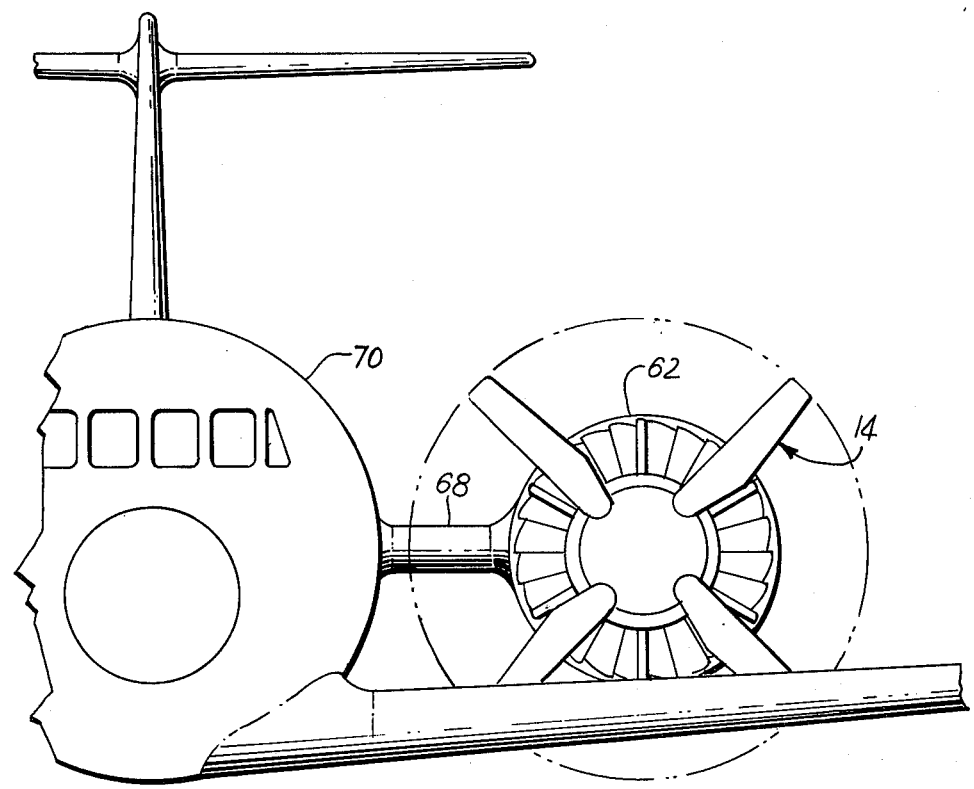
FIG. 4 is a view of a compound propulsor mounted on an aircraft.

The cowling 62 is preferably rigidly connected with a structural portion of the core engine 10, such as the core casing 56, through a plurality of struts 66. The struts 66 may also act as guide vanes for the flow of air through the bypass flow duct 52. As can best be seen in FIG. 4, the cowling 62 is also connected with a structural portion 68 of the vehicle, such as an aircraft 70, to which the compound propulsor is mounted. The above-described connections are fabricated to be strong enough to permit cantilevering of the compound propulsor at a sufficient distance from the vehicle to provide clearance of the propeller 14 from the vehicle.

Figure 5:
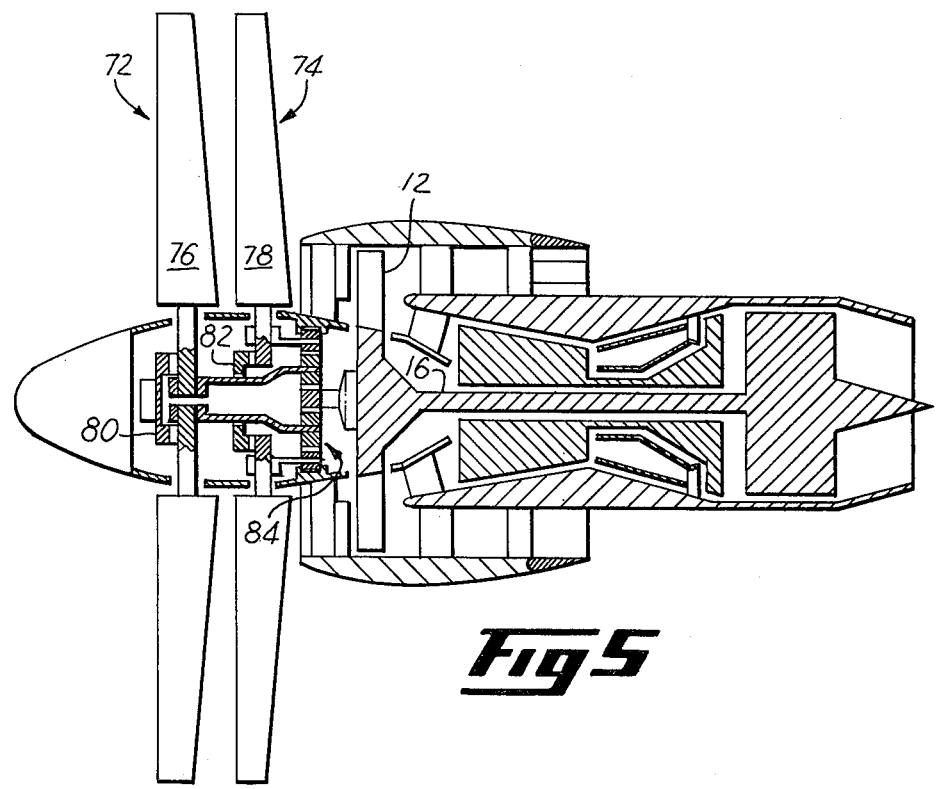
FIG. 5 is a cross-sectional view of a third embodiment of a compound propulsor incorporating features of the present invention.

Turning now to FIG. 5, there is shown a third configuration of the compound propulsor. This configuration includes the same components and operates in the same manner as does the first configuration shown in FIG. 1, except that this third configuration includes two propellers spaced axially apart. As can be seen in FIG. 5, this configuration of the compound propulsor includes a first propeller 72 and a second propeller 74, each propeller comprising a plurality of propeller blades 76 and 78, respectively. The first propeller 72 and the second propeller 74 each includes means for varying the pitch of the blades of that propeller, the means being represented by the boxes 80 and 82, respectively. Preferably, the pitch varying means 80 and 82 are operable independently of each other such that, at any given moment, the pitch of the blades 76 of the first propeller 72 is not necessarily the same as the pitch of the blades 78 of the second propeller 74.

The first and second propeller 72 and 74 are driven by a rotatable shaft 16 through a gear train 84. The gear train 84 and the first and second propellers 72 and 74 can be arranged whereby both propellers rotate in the same direction. Alternatively, the gear train 84 and the first and second propellers 72 and 74 can be arranged whereby the gear train 84 imparts rotation to the second propeller 74 in a direction opposite to the direction of the rotation imparted to the first propeller 72, that is, the propellers are counter rotating. The rotational velocities of the first and second propellers 72 and 74 can be the same or different, depending upon the gear train arrangement. Also, the number of propeller blades 76 in the first propeller 72 can be the same as or different from the number of propeller blades 78 on the second propeller 74. However, it is preferable for performance and acoustic reasons that where the first and second propellers 72 and 74 are counter rotating, that the ratio of the number of blades 76 of the first propeller 72 to the number of blades 78 of the second propeller 74 be typically in the ratio of five to four (5:4).

Figure 6:
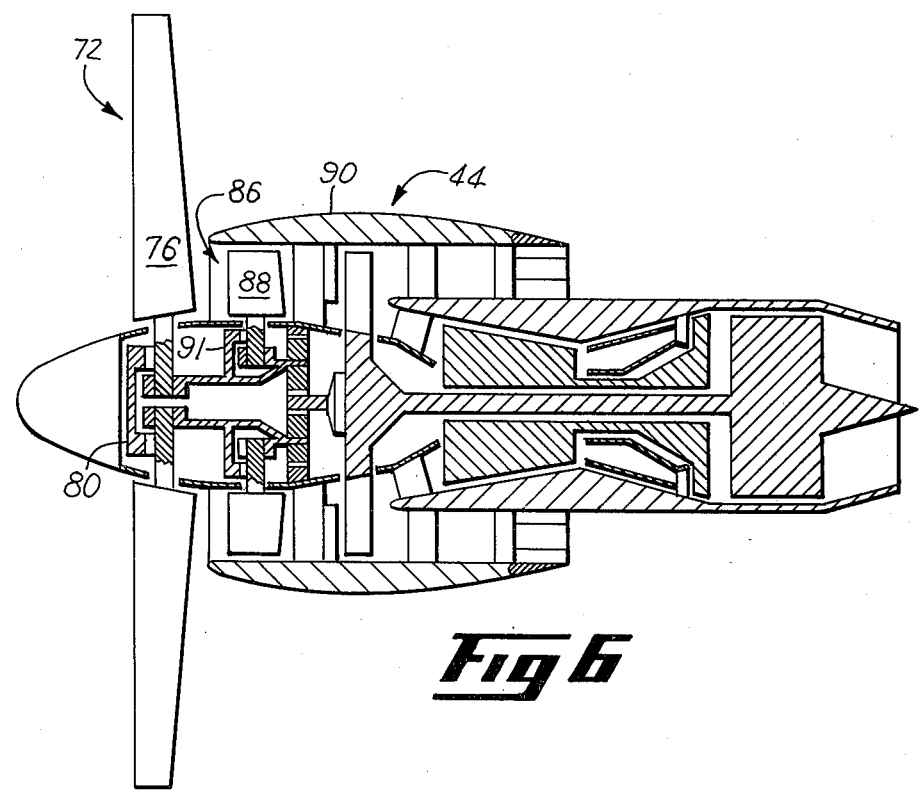
FIG. 6 is a cross-sectional view of a fourth embodiment of a compound propulsor incorporating features of the present invention.

Turning now to FIG. 6, there is shown a fourth configuration of the compound propulsor. This configuration is similar to and operates substantially the same as the third configuration shown in FIG. 5, except that it includes a cropped second propeller 86 comprising propeller blades 88 which have radial lengths shorter than the radial lengths of the blades 76 of the first propeller 72. Additionally, the cropped second propeller 86 may be encased within a cowl 90 which can be integral with or separate from the cowl encasing the fan section 44. The first propeller 72 includes means 80 for varying the pitch of its blades 76, while the cropped second propeller 86 includes means 91 for varying the pitch of the blades 88, each pitch varying means preferably being operable independently of the other.

The number of blades and the rotational direction and speed of the first propeller 76 and of the cropped second propeller 86 can be the same or different, as desired by performance considerations. However, it is preferably in the configuration shown in FIG. 6 that the blades 88 of the cropped second propeller 86 be disposed circumferentially relative to the blades 76 of the first propeller 72 for, in at least some blade pitch positions, reinforcing the pumping characteristics of the blades 76 of the first propeller 72. That is, at certain blade pitch positions, each of the blades 88 of the cropped second propeller 86 will be aligned with one of the blades 76 of the first propeller 72 such that each pair of blades effectively comprises a single large blade having a chordal length equal to the chordal lengths of the blades 76 and 88 plus the distance between them.

Figure 7:
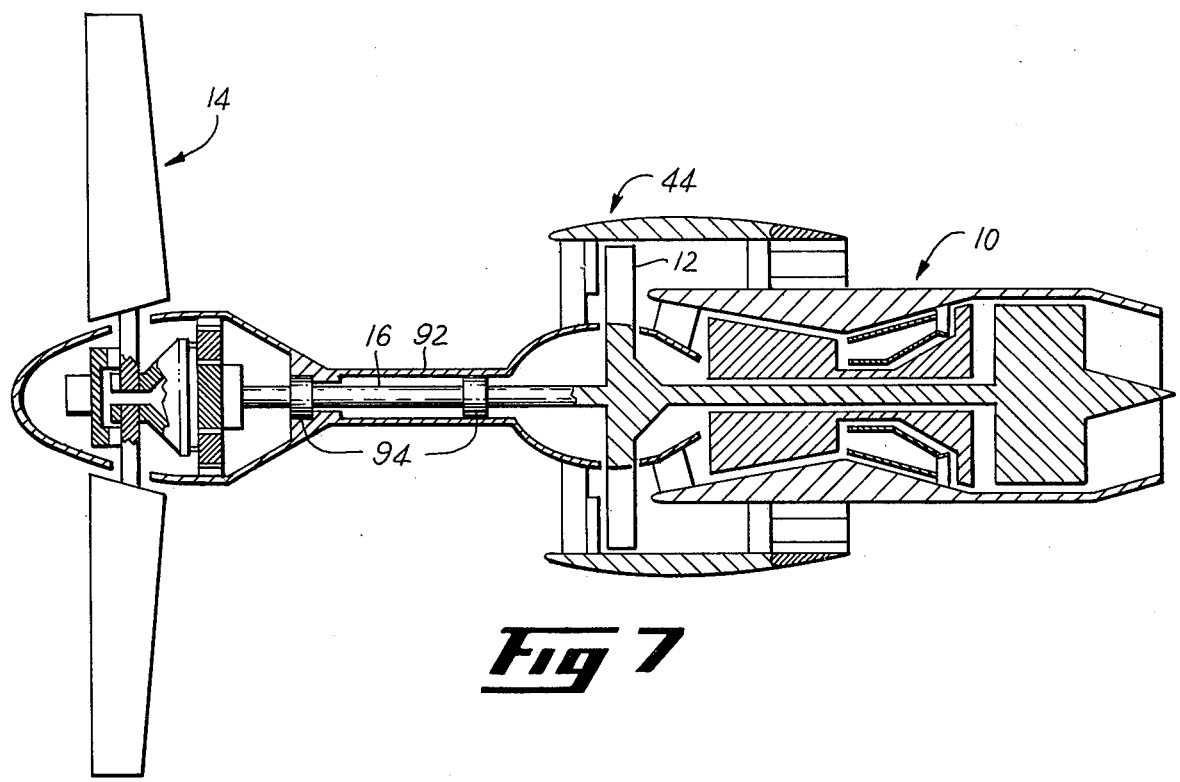
FIG. 7 is a cross-sectional view of a fifth embodiment of a compound propulsor incorporating features of the present invention.

FIG. 7 shows a fifth configuration of the compound propulsor. This configuration is similar to and operates substantially the same as that shown in FIG. 1 except that the rotatable shaft 16 is axially elongated to separate the propeller 14 from the fan section 44. Such a configuration may be desirable for installation or weight balancing reasons. This configuration includes a static tubular housing 92 including intermediate bearings 94 therein to support the elongated rotatable shaft 16.

It is to be understood that this invention is not limited to the particular embodiments disclosed, and it is intended to cover all modifications coming within the true spirit and scope thereof.

What is claimed is:

1. A compound propulsor comprising:
   a. a core gas turbine engine for producing power;
   b. a fan section including a fan encased within a cowl;
   c. at least one propeller comprising a plurality of blades and including means for varying the pitch of said blades; and
   d. a single rotatable shaft connecting a turbine of said core engine with said fan and a gear train coupling said single rotatable shaft to each said propeller, whereby said single rotatable shaft distributes a portion of said power to said fan and another portion of said power to each said propeller.

2. The compound propulsor of claim 1 further including means for varying said portions of power distributed between said fan and said propeller.

3. The compound propulsor of claim 2 wherein said means for varying said portions of power between said fan and said propeller comprises variable geometry inlet guide vanes disposed within said fan section and upstream of said fan.

4. The compound propulsor of claim 3 wherein said core engine and said fan section are configured whereby the gas flowpath downstream of said fan comprises a bypass flow duct and a core flow duct and wherein said variable geometry inlet guide vanes comprise part span variable guide vanes for modulating the gas flow primarily of said bypass flow duct.

5. The compound propulsor of claim 4 wherein said bypass flow duct includes an exit nozzle and said compound propulsor further comprises means for varying the area of said exit nozzle correspondingly with the positions of said variable geometry inlet guide vanes.

6. The compound propulsor of claim 1 comprising a first propeller and a second propeller spaced axially apart.

7. The compound propulsor of claim 6 wherein said means for varying the pitch of the blades of said first propeller is operable independently of the means for varying the pitch of the blades of said second propeller.

8. The compound propulsor of claim 7 wherein drive means comprises said rotatable shaft extending from said turbine of said core engine to said fan and said first and second propellers, said shaft being arranged for driving said first and second propellers through said gear train.

9. The compound propulsor of claim 8 wherein said gear train is arranged for imparting rotation to said second propeller in a direction opposite to the direction of the rotation imparted to said first propeller.

10. The compound propulsor of claim 9 wherein the ratio of the number of said blades of said first propeller to the number of said blades of said second propeller is five to four.

11. The compound propulsor of claim 8 wherein said first and said second propellers have an equal number of blades.

12. The compound propulsor of claim 11 wherein said blades of said second propeller are disposed circumferentially relative to said blades of said first propeller for, in at least some blade pitch positions, reinforcing the pumping characteristics of said blades of said propeller.

13. The compound propulsor of claim 12 wherein said second propeller is disposed downstream of said first propeller, and wherein said blades of said second propeller have a radial length shorter than the radial length of said blades of said first propeller.

14. The compound propulsor of claim 13 further comprising a cowl encasing said second propeller.

15. A compound propulsor comprising:
a. a core gas turbine engine for producing power and including a core flow duct therethrough;
b. a fan section including a fan encased within a cowl and variable geometry inlet guide vanes disposed upstream of said fan, said fan section further including a bypass flow duct therethrough;
c. a propeller disposed upstream of said fan and comprising a plurality of blades, said propeller including means for varying the pitch of said blades; and
d. a single rotatable shaft for connecting a turbine of said core engine with said fan and a gear train coupling said single rotatable shaft to said propeller, whereby said single rotatable shaft distributes a portion of said power to said fan and another portion of said power to said propeller.

16. The compound propulsor of claim 15 wherein said fan and said bypass and said core flow ducts are configured for providing a bypass ratio of between 2 and 6.

17. The compound propulsor of claim 15 wherein said rotatable shaft is axially elongated for separating said propeller from said fan section.

18. The compound propulsor of claim 15 wherein said bypass duct is disposed radially outwardly of said core engine, the radially outer boundary of said bypass duct being defined by a cowling extending from said fan section to past the downstream end of said core engine, and wherein said compound propulsor further includes mixer means disposed downstream of said turbine for mixing at least a portion of the gases of said bypass flow duct with at least a portion of the gases of said core flow duct.

19. The compound propulsor of claim 18 wherein said cowling is rigidly connected with a structural portion of said core engine and with a structural portion of a vehicle to which the compound propulsor is mounted in a manner as to permit cantilevering of said compound propulsor at sufficient distance from said vehicle to provide clearance of said propeller from said vehicle.

20. A compound propulsor comprising:
a. a core gas turbine engine for producing power;
b. a fan section including a fan encased within a cowl and variable geometry inlet guide vanes disposed upstream of said fan;
c. a first propeller disposed upstream of said fan and comprising a plurality of blades and means for varying the pitch of said blades;
d. a second propeller disposed between said first propeller and said variable geometry inlet guide vanes and encased within said cowl encasing said fan, said second propeller comprising a plurality of blades having radial lengths shorter than the radial lengths of said blades of said first propeller, said second propeller further comprising means for varying the pitch of said blades thereof operable independently of said means for varying the pitch of said blades of said first propeller; and
e. a single rotatable shaft for coupling said core engine with said fan and a gear train coupling said single rotatable shaft to said first and said second propellers, whereby said single rotatable shaft distributes a portion of said power to said fan and another portion of said power to said first and said second propellers.

* * * * *